US006535607B1

(12) United States Patent
Chandersekaran et al.

(10) Patent No.: US 6,535,607 B1
(45) Date of Patent: Mar. 18, 2003

(54) METHOD AND APPARATUS FOR PROVIDING INTEROPERABILITY BETWEEN KEY RECOVERY AND NON-KEY RECOVERY SYSTEMS

(75) Inventors: Coimbatore S. Chandersekaran, Potomac, MD (US); Rosario Gennaro, New York, NY (US); Sarbari Gupta, Rockville, MD (US); Stephen M. Matyas, Jr., Manassas, VA (US); David R. Safford, Brewster, NY (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/184,002

(22) Filed: Nov. 2, 1998

(51) Int. Cl.[7] .............................. H04L 9/00; H04L 9/30; H04L 9/32
(52) U.S. Cl. ...................... 380/286; 380/281; 380/277; 380/30; 713/193; 713/168
(58) Field of Search ................................. 380/286, 273, 380/150; 713/168, 169, 171

(56) References Cited

U.S. PATENT DOCUMENTS

| 4,200,770 A |   | 4/1980 | Hellman et al. ............ 178/22 |
| 4,941,176 A | * | 7/1990 | Matyas et al. ............. 380/21 |
| 5,276,737 A |   | 1/1994 | Micali ...................... 380/30 |

(List continued on next page.)

OTHER PUBLICATIONS

"A Taxonomy For Key Escrow Encryption Systems" by D. E. Denning and D. K. Branstad, Communications of the ACM—Mar. 1996/vol. 30, No. 3, pp. 34–40.

(List continued on next page.)

Primary Examiner—Gilberto Barrón
Assistant Examiner—Kambiz Zand
(74) Attorney, Agent, or Firm—William A. Kinnaman, Jr.

(57) ABSTRACT

A method and apparatus for ensuring that a key recovery-enabled (KR-enabled) system communicating with a non-KR-enabled system in a cryptographic communication system transmits the information necessary to permit key recovery by a key recovery entity. In a first embodiment, data is encrypted under a second key K that is generated as a one-way function of a first key K' and a key recovery block KRB generated on the first key K'. The key recovery block KRB and the encrypted data e(K, data) are transmitted to the receiver, who cannot decrypt the data without regenerating the second key K from the first key K' and the key recovery block KRB. In a second embodiment, data is encrypted under a second key K that is generated independently of the first key K'. A third key X, generated as a one-way function of the first key K' and a key recovery block KRB generated on the second key K, is used to encrypt the XOR product Y of the first and second keys K', K. The key recovery block KRB, the encrypted XOR product e(X, Y) and the encrypted data e(K, data) are transmitted to the receiver, who cannot decrypt the data without regenerating the third key X from the first key K' and the key recovery block KRB, decrypting the XOR product Y using the regenerated third key X, and recombining the XOR product Y with the first key K" to regenerate the second key K. In a third embodiment, an integrity value is computed on a key K and its key recovery block KRB. The integrity value and the key K are encrypted to form an encrypted portion of a key exchange block KEB, while the key recovery block KRB is put in an unencrypted portion of the key exchange block KEB, which is sent along with the encrypted data e(K, data) to the receiver. The receiver decrypts the encrypted portion, recomputes the integrity value and compares it with the received integrity value. Only if the two integrity values compare is the key K extracted and used to decrypt the data.

56 Claims, 9 Drawing Sheets

U.S. PATENT DOCUMENTS

| | | | | |
|---|---|---|---|---|
| 5,315,658 A | | 5/1994 | Micali | 380/30 |
| 5,557,346 A | | 9/1996 | Lipner et al. | 380/21 |
| 5,796,830 A | | 8/1998 | Johnson et al. | 380/21 |
| 5,815,573 A | | 9/1998 | Johnson et al. | 380/21 |
| 6,035,041 A | * | 3/2000 | Frankel et al. | 380/30 |
| 6,141,753 A | * | 10/2000 | Zhao et al. | 713/176 |

OTHER PUBLICATIONS

"Public Key Infrastructure—Binding Cryptography—A Fraud–Detectible Alternative To Key–Escrow Proposals" by E. Verheul et al, Computer Law & Security Report, vol. 13, No. 1, 1997, pp. 3–14.

Federal Information Processing Standards Publication 46–2, Dec. 30, 1993, Announcing the Standard for "Data Encryption Standard (DES)", http://www.itl.nist.gov/div897/pubs/fip46–2.htm.

Federal Information Processing Standards Publication 81, Dec. 2, 1980, Announcing the Standard for "DES Modes of Operation", http://www.itl.nist.gov/div897/pubs/fip81.htm.

* cited by examiner

METHOD AND APPARATUS FOR PROVIDING INTEROPERABILITY BETWEEN KEY RECOVERY AND NON-KEY RECOVERY SYSTEMS

BACKGROUND OF THE INVENTION

1. Field of the Invention

This invention relates to a method and apparatus for providing interoperability between key recovery and non-key recovery systems. More particularly, the invention relates to a method and apparatus for ensuring, in a cryptographic communication system in which a sender transmits data encrypted under an encryption key to a receiver, the concomitant transmission of data sufficient to permit recovery of the encryption key by a key recovery entity.

2. Description of the Related Art

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private-key) encryption systems use the same secret key for both encrypting and decrypting messages. Perhaps the best-known symmetric encryption system is the Data Encryption Algorithm (DEA), implementing the Data Encryption Standard (DES) as described in the National Institute of Standards and Technology (NIST) publications "Data Encryption Standard (DES)", FIPS PUB 46-2 (1980), and "DES Modes of Operation", FIPS PUB 81 (1988). In the DES system, a 64-bit key is used to transform a plaintext message comprising one or more 64-bit plaintext blocks into a ciphertext message comprising a like number of 64-bit ciphertext blocks, or vice versa. Of the 64 key bits, 56 bits are independently specifiable, while the remaining 8 bits provide a parity check.

Asymmetric (or public-key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman and described in B. Schneier, *Applied Cryptography* (1996), pages 466–474, incorporated herein by reference.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies, since the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (i.e., systematically testing all possible keys until the right one is found). Such weak encryption systems have the obvious disadvantage that they are just as vulnerable to unauthorized third parties as they are to authorized government officials.

Various cryptographic key recovery systems have recently been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents, either by actually giving key-related recovery information to the key recovery agents ahead of time (in which case the recovery information is said to be "escrowed") or by providing sufficient information in the communication itself (as by encrypting the key portions) which the key recovery agents could obtain after the communication occurred. Key recovery agents would reveal the escrowed or regenerated key information to a requesting law enforcement agent only upon presentation of proper evidence of authority, such as a court order authorizing the interception. The use of multiple key recovery agents, all of which must cooperate to recover the key, minimizes the possibility that a law enforcement agent can improperly recover a key by using a corrupt key recovery agent or that a compromise in the physical security of a single key recovery agent will expose the key.

Key recovery systems serve the communicants' interest in privacy, since their encryption system retains its full strength against third parties and does not have to be weakened to comply with domestic restrictions on encryption or to meet export requirements. At the same, key recovery systems serve the legitimate needs of law enforcement by permitting the interception of encrypted communications in circumstances where unencrypted communications have previously been intercepted (as where a court order has been obtained).

In addition to serving the needs of law enforcement, key recovery systems find application in purely private contexts. Thus, organizations may be concerned about employees using strong encryption of crucial files where keys are not recoverable. Loss of keys may result in loss of important stored data.

Key recovery systems of various types are described in U.S. Pat. Nos. 5,557,346 (Lipner et al.); 5,815,573 (Johnson et al.); and 5,796,830 (Johnson et al.), as well as in copending U.S. patent applications Ser. Nos. 08/725,102, filed Oct. 2, 1996 (Gennaro et al.); 08/775,348, filed Jan. 3, 1997 (Gennaro et al.); and 08/899,855, filed Jul. 24, 1997 (Chandersekaran et al.), all of which are incorporated herein by reference.

An important aspect of key recovery systems is the method used to ensure that correct recovery information is provided. If the recovery information provided is not correct, either through unintentional error, or deliberate attempt to corrupt, the functionality of the key recovery system can be thwarted. Ordinarily, in the absence of some earlier validation check, any deficiency in the key recovery information is only detected when key recovery is attempted by a key recovery entity, which is generally too late to cure the deficiency.

Validation can be provided in several ways, including direct checking by the participants, checking by the recovery agents, and checking by the recovery entity. Access to accurate key recovery information can also be ensured by redundant calculation and disclosure of the recovery information by more than one of the communicating parties.

In a network of interconnected computer systems, where some computer systems are key recovery enabled (KR-enabled)—i.e., are capable of generating key recovery information —and some are non-KR-enabled, it would be desirable to permit a KR-enabled computer to interoperate with both KR-enabled and non-KR-enabled computers only if key recovery is enforced.

FIG. 1 shows a cryptographic system 100 comprising a KR-enabled computer system 102 coupled to a non-KR-enabled computer system 104 via a communications channel 106. We assume the following model of trusted and untrusted components:

1. The KR-enabled system 102 has a key recovery subsystem 108 that provides key recovery and other cryptographic services to one or more application programs 110. KR subsystem 108 may be implemented as software, as hardware, or as some combination of the two.
2. The non-KR-enabled system 104 has a cryptographic subsystem 112 that provides cryptographic services to one or more application programs 114. Like KR subsystem 108, cryptographic subsystem 110 may be implemented as software, as hardware, or as some combination of the two.
3. The KR-enabled key recovery subsystem 108 and its supporting cryptographic subsystem (not separately shown, but included within the KR subsystem) will enforce the use of the key recovery protocol, regardless of whether it is communicating with a KR-enabled or a non-KR-enabled system.
4. The key recovery subsystem 108 of the KR-enabled system 102 is a trusted component. It can be trusted to enforce the key recovery protocol.
5. The application programs 110 running on the KR-enabled system 102, the cryptographic subsystem 112 of the non-KR-enabled system 104, and the application programs 114 running on the non-KR-enabled system 104 are not trusted components. These components cannot be trusted to enforce the key recovery protocol. In fact, it is assumed that the applications 110 and 114 running on the KR-enabled and non-KR-enabled systems 102 and 104, respectively, might attempt to circumvent the key recovery protocol, if such a circumvention were possible.

Consider an ideal situation in which a KR-enabled system 102 (Alice) communicates with a non-KR-enabled system 104 (Bob), where Alice's application program 110 is assumed (for the sake of argument) to perform the key recovery protocol correctly.

Alice's system 102 performs the following steps:
1. Alice generates a key K, which is to be used for strong encryption.
2. Alice generates a key exchange block (KEB), containing K, which is used to transport K in encrypted form to Bob.
3. Alice generates a key recovery block (KRB), which contains all the information needed to enable key recovery.
4. Alice encrypts data with K to produce ciphertext e(K, data).
5. Alice sends KEB, KRB, and e(K, data) to Bob.

Upon receipt of KEB, KRB, and e(K, data), Bob's system 104 performs the following steps:
1. Since Bob is non-KR-enabled, Bob ignores KRB.
2. Bob recovers K from KEB.
3. Bob decrypts e(K, data) to recover the data.

Now consider the case where Alice's application 110 does not behave properly. We observe that Alice's application 110 can easily circumvent the key recovery protocol by simply not sending KRB to Bob. Without KRB, there is no effective means for law enforcement to recover the key, even with a lawful warrant or court order. Bob, on the other hand, did not need KRB for anything, so its absence creates no problem.

If Bob is KR-enabled, and honest, then Bob could be designed to operate with Alice only if Alice sends Bob a correct KRB. One approach is for Bob recreate the KRB and compare it for equality with the KRB received from Alice. Bob's version of the key K is enabled for use only if the KRBs compare equal. However, the procedure for recreating the KRB typically involves a computationally expensive public-key encryption operation. Also, the procedure requires that Bob's system be trusted to perform the verification operation.

One possible alternative method of solution is for Alice's key recovery system to alter the plaintext prior to encryption, in such a way that Bob can recover the plaintext only if he also receives a correct copy of KRB. However, if Alice and Bob conspire to defeat the KR solution method, then the possible methods that we describe here can be attacked. Hence, it does not appear that a workable solution can be obtained by altering the plaintext. For example, the data could be combined with KRB using an invertible function F to produce F(data, KRB), where the quantity F(data, KRB) is then encrypted with the key K. In this case, Alice sends e(F(data, KRB)) to Bob instead of e(K, data). To illustrate this method still further, suppose that the data, X, is divided into blocks X1, X2, . . . , Xn, where the length of each Xi (except for the last block Xn) is equal to the length of KRB. Then KRB, or some appropriate sub-portion, is Exclusive-ORed (XORed) with each Xi to produce (X1 $\oplus$KRB), (X2 $\oplus$KRB), etc., and the masked plaintext is then encrypted with the key K. (The symbol "$\oplus$" denotes XOR addition.) The idea here is that Alice would be required to send KRB to Bob in order for Bob to invert the process and recover the clear data. However, a problem with this method is that Alice and Bob could agree to exchange an encrypted KRB instead of a clear KRB. In this case, Alice sends KEB, e(K, KRB), and e(K, F(data, KRB)) to Bob. Using KEB, Bob imports K into his system, and then decrypts e(K, KRB) and e(K, F(data, KRB)) using K. Bob then uses the clear value of KRB to recover the original data from F(data, KRB). In this case, as long as Alice is able to send an encrypted copy of KRB to Bob, Bob can invert the function performed by Alice's system, regardless of what function is used.

Another problem with perturbing the plaintext with the KRB using an invertible function (e.g., an Exclusive-OR function) before encrypting it is that Alice is not prevented from modifying the plaintext—in the same way—with the KRB before invoking the encryption operation. In that case, Alice would Exclusive-OR the KRB with the blocks of plaintext, X1, X2, etc. so that when the KR system performs the KRB-based perturbation again, the real plaintext is the text finally encrypted, thus effectively foiling the scheme.

Another possible alternative method of solution is for Alice's key recovery system to alter the ciphertext after encryption, such that Bob could recover the plaintext only if he also receives a clear copy of KRB. However, there seems to be no way to accomplish this, since any alteration of the ciphertext that Bob could invert using KRB could also be inverted by Alice using KRB. And Alice, could merely send Bob the unaltered ciphertext without KRB instead of sending Bob the altered ciphertext with KRB.

SUMMARY OF THE INVENTION

The present invention describes a method in which Bob is able to decrypt the encrypted data, e(K, data), received from Alice only if a valid KRB is provided to Bob. The solution enables Alice (who obeys the rules for key recovery) to communicate with Bob, who may or may not be enabled for key recovery. The solution does not allow Bob, who is not KR-enabled, to communicate with Alice, who is KR-enabled. This latter case is not possible since Bob, who is not KR-enabled, has no way to generate a KRB to send to Alice, and Alice's decryption service is enabled only after receiving a valid KRB from Bob.

In accordance with the invention, the establishment of K in Bob's system is made dependent on Bob having a clear copy of KRB. In this case, Alice cannot subvert the protocol by encrypting KRB with K, since then (without KRB) Bob has no way to recover K in his system—i.e., Bob is confronted with a "chicken and egg" problem. Different methods can be used to tie the recovery of K to KRB, as described below.

The method of the present invention would replace the method described in the background section above, in which Bob recreates the KRB and compares it for equality with the KRB received from Alice. And because the method of the invention is an integral part of the decryption operation, it can provide a stronger form of checking. Also, Bob can avoid the costly public-key encryption steps that are required to recreate the KRB.

DESCRIPTION OF THE PREFERRED EMBODIMENTS

1. First Embodiment

Figure 2:
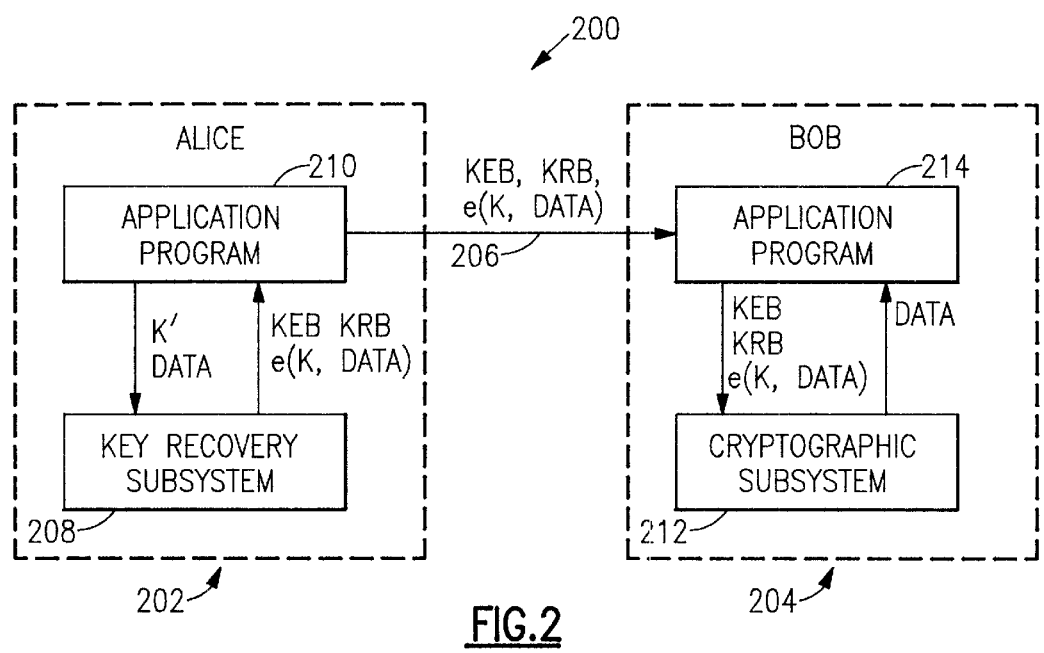
FIG. 2 shows a cryptographic communication system incorporating a first embodiment of the present invention.

FIG. 2 shows a cryptographic communication system 200 incorporating a first embodiment of the present invention.

Figure 1:
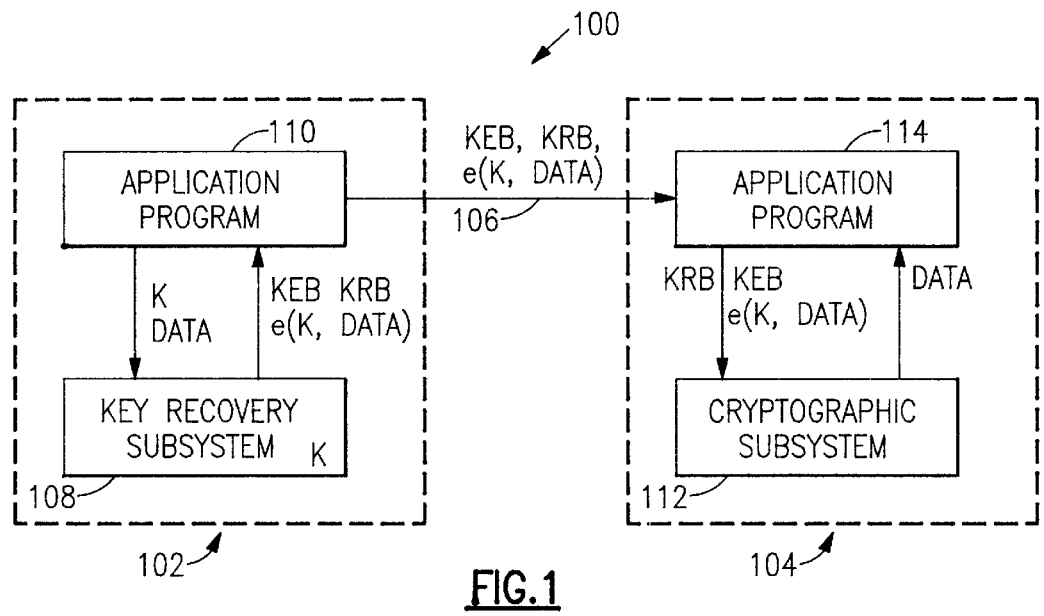
FIG. 1 shows a cryptographic communication system comprising a key-recovery-enabled (KR enabled) computer system and a non-KR-enabled computer system.

System 200 is similar in its general organization to system 100 (FIG. 1). More particularly, system 200 comprises a KR-enabled computer system 202 coupled to a non-KR-enabled computer system 204 via a communications channel 206. The KR-enabled system 202 has a key recovery (KR) subsystem 208 that provides key recovery and other cryptographic services to one or more application programs 210, while the non-KR-enabled system 204 has a cryptographic subsystem 212 that provides cryptographic services to one or more application programs 214.

As with the corresponding components of system 100, KR subsystem 208 is assumed to be a "trusted" component, while application programs 208 and 210 and cryptographic subsystem 212 are not. System 200 differs from system 100 in the operations performed and the data flows between the various components, as described below.

In this first embodiment, the key recovery subsystem 208 in Alice's (i.e., the sender's) system 202 defines the encryption key K actually used to encrypt the data as follows:

$$K = \text{Hash}(e(K', KRB)),$$

where K' is a first key either generated by the subsystem 208 or (as assumed below) received from the application program 210, KRB is a key recovery block generated on K', e(X, Y) denotes symmetric (e.g. DES) encryption of Y under the key X, and Hash(X) denotes a "one-way" cryptographic hash function. That is, K is a hash of the ciphertext produced by encrypting KRB with K'. In this case, K' is an independent variable and K is a dependent variable; K can be computed only after both K' and KRB have been produced.

The following assumptions are made about the secrecy of K' and K:

1. K' may or may not be known to Alice's application program 210.
2. K is unknown to Alice's application program 210. Since Alice (i.e., the application program 210) has no means to encrypt with the "strong" key K', she cannot compute e(K', KRB) and therefore has no means to compute K. Moreover, Alice cannot have another party encrypt KRB with K' without exposing KRB.

In the envisioned protocol, Alice's application program 210, using the services of the key recovery subsystem 208 when required, generates a key exchange block (KEB) for key K', generates a key recovery block (KRB) for K', encrypts data to produce e(K, data), and transmits KEB, KRB, e(K, data) to Bob. Bob, who must have KRB in order to compute K, cannot circumvent the protocol. Under the protocol, Alice must send KRB to Bob.

Figure 3:
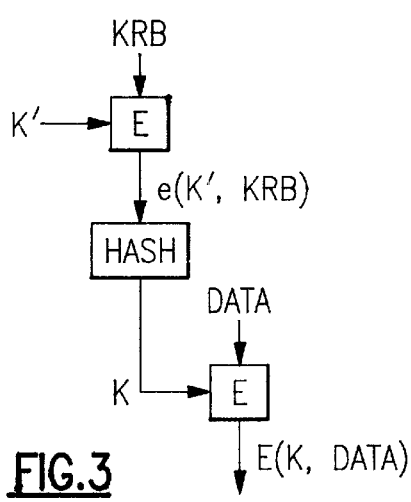
FIG. 3 shows the data transformations performed by the sender in the system shown in FIG. 2.
Figure 5:
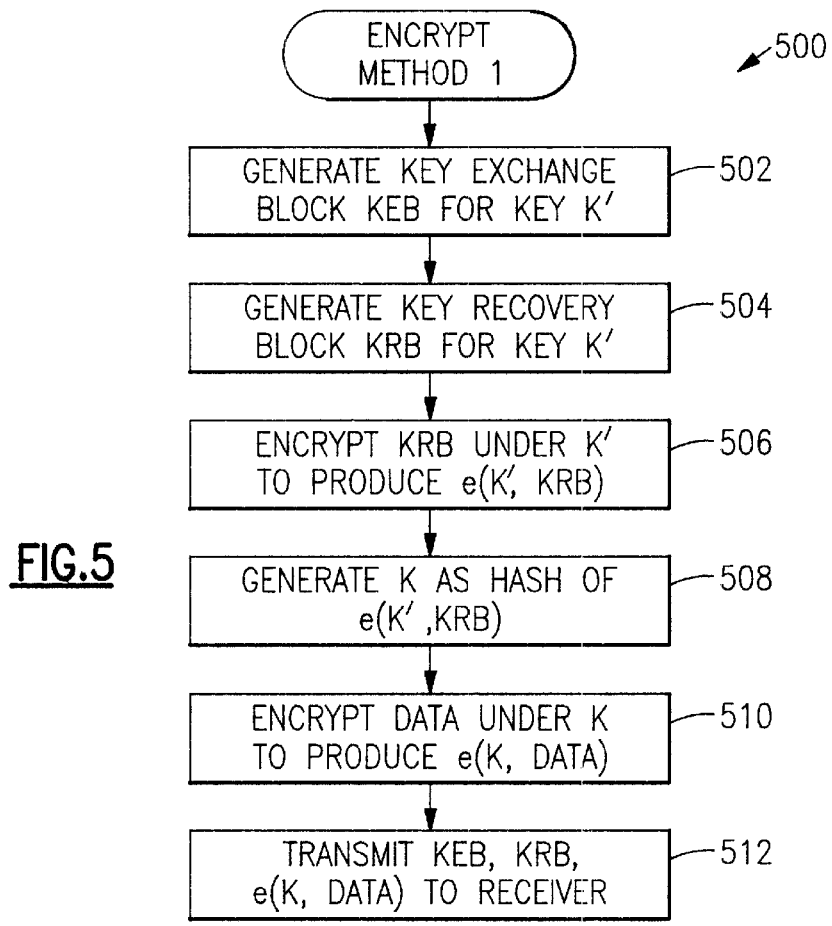
FIG. 5 shows the method steps performed by the sender in the system shown in FIG. 2.

FIG. 5 shows the encryption procedure 500 performed by the sender 202 (Alice) in the system 202 shown in FIG. 2. FIG. 3 shows the data transformations performed in this procedure 500. The procedure 500 may be invoked when application program 210 provides a first key K' and plaintext data to KR subsystem 208.

Upon receiving these parameters, the KR subsystem 208 first generates a key exchange block KEB from which the first key K' may be recovered by the receiver 204 (step 502). This may be done by encrypting the key K' under a public encryption key of the receiver 204, using a public-key procedure.

The KR subsystem 208 then generates a key recovery block KRB from which the first key K' may be recovered by a key recovery entity (step 504). (The term "key recovery entity" is used as an umbrella term for key recovery agents, law enforcement agents, and others involved in the key recovery process.) If there is one such entity, this may be done by encrypting the key K' under a public encryption key of the key recovery entity. If there are multiple such entities, this may be done by encrypting shares of the key K' under respective public encryption keys of the key recovery entities.

Next, the KR subsystem 208 encrypts the key recovery block KRB under the first key K' to generate an encrypted value e(K', KRB), as shown in FIG. 3 (step 506). The KR subsystem then passes this encrypted value through a hash function to obtain a second key K=Hash(e(K', KRB)), as shown in FIG. 3 (step 508). This second key is kept in a private area of the KR subsystem 208 and is not made available to the application 210. Finally, the KR subsystem 208 encrypts the original plaintext data under the second key K to obtain e(K, data), as shown in FIG. 3 (step 510). The KR subsystem 208 returns the key exchange block KEB, the key recovery block KRB and the encrypted value e(K, data) to the application program 210, which transmits these values to the application program 214 in the receiver 204 (step 512).

Figure 4:
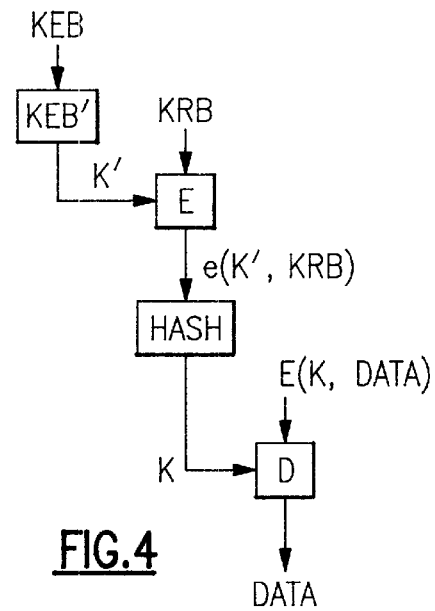
FIG. 4 shows the data transformations performed by the receiver in the system shown in FIG. 2.
Figure 6:
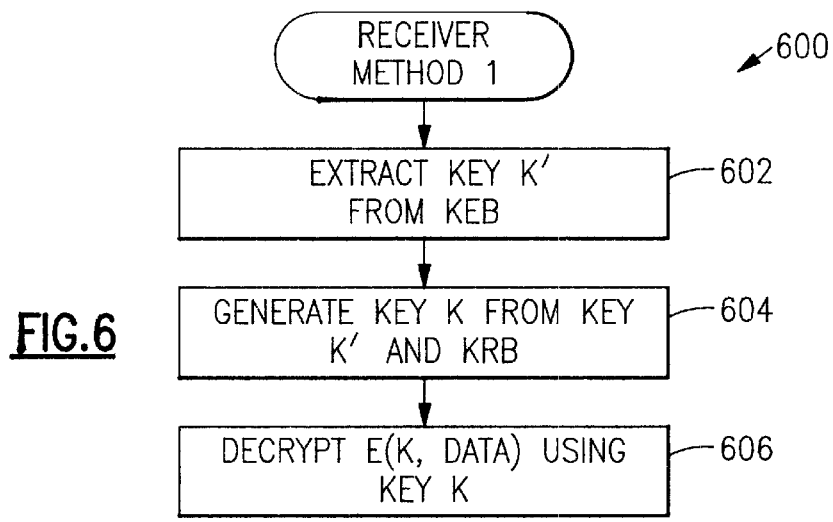
FIG. 6 shows the method steps performed by the receiver in the system shown in FIG. 2.

FIG. 6 shows the procedure 600 performed by the receiver 204 (Bob) in the system shown in FIG. 2. FIG. 4 shows the data transformations performed in this procedure 600. The steps shown are performed by the cryptographic subsystem 212 upon receiving the values KEB, KRB and e(K, data) from the application program 214.

Subsystem 212 first extracts the first key K' from the key exchange block KEB by using an extraction procedure EXTR that reverses the generation procedure, as shown in FIG. 4 (step 602). Thus, if KEB was generated by encrypting K' under a public encryption key of the receiver 204, then K' is extracted by decrypting KEB using the corresponding private decryption key. Subsystem 212 then regenerates the second key K from the first key K' and the KRB, using the same procedure as the sender 202 in steps 506–508, as shown in FIG. 4 (step 604). Finally, subsystem 212 decrypts e(K, data) using the second key K, as shown in FIG. 4 (step 606), and returns the plaintext data to the application program 214.

2. Second Embodiment

Figure 7:
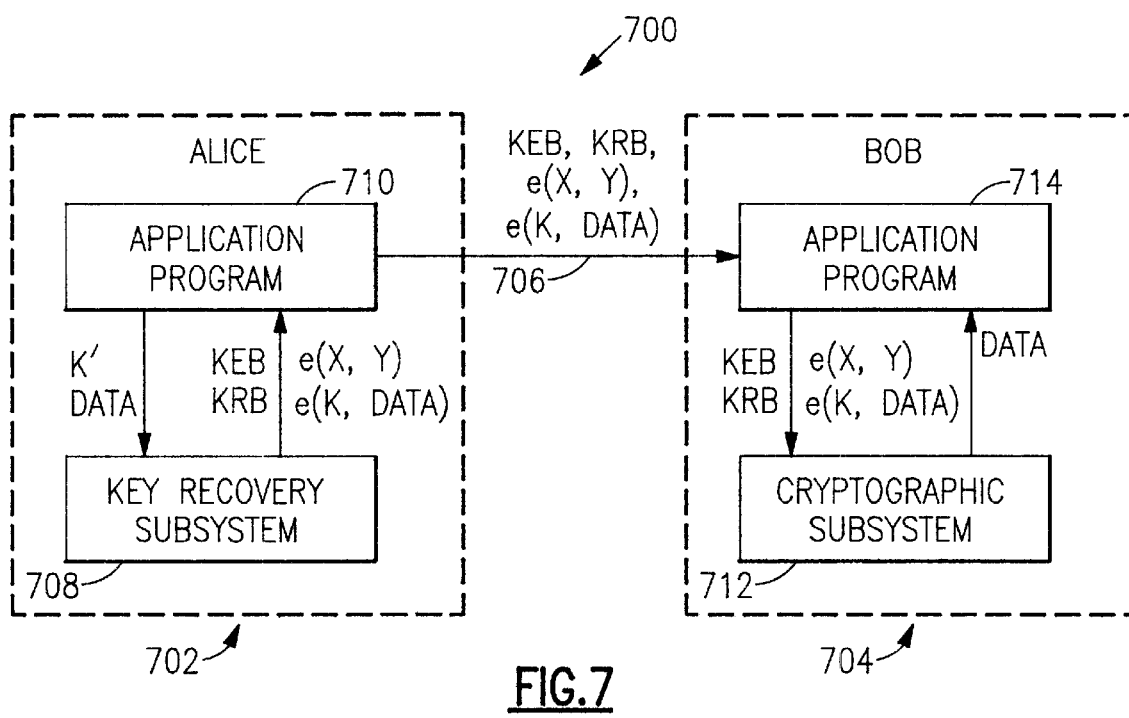
FIG. 7 shows a cryptographic communication system incorporating a second embodiment of the present invention.

FIG. 7 shows a cryptographic communication system 700 incorporating a second embodiment of the present invention.

System 700 is similar in its general organization to systems 100 and 200. More particularly, system 700 comprises a KR-enabled computer system 702 coupled to a non-KR-enabled computer system 204 via a communications channel 706. The KR-enabled system 702 has a key recovery subsystem 708 that provides key recovery and other cryptographic services to one or more application programs 710, while the non-KR-enabled system 704 has a cryptographic subsystem 712 that provides cryptographic services to one or more application programs 714.

As with the corresponding components of systems 100 and 200, KR subsystem 708 is assumed to be a "trusted" component, while application programs 708 and 710 and cryptographic subsystem 712 are not. System 700 differs from systems 100 and 200 in the operations performed and the data flows between the various components, as described below.

In this second embodiment, the key recovery subsystem 708 defines independent first and second encryption keys K' and K, as follows:

$$Y = K' \oplus K,$$

where Y is a dependent value calculated from K' and K. As in the first embodiment, K' is the ostensible key, made available outside the KR subsystem 708, while K is the key actually used to encrypt data. Unlike the procedure in the first embodiment, however, K is generated independently of K'.

The following assumptions are made about the secrecy of K, K', and Y:
1. K' may or may not be known to Alice's application program 710.
2. K is unknown to Alice's application program 710.
3. Y is unknown to Alice's application program 710. Since Alice (i.e., the application program 710) does not know K, she cannot compute Y from K and K'.

The trick employed here is to encrypt and send Y to Bob by encrypting it with a third key X derived from K' and KRB, as follows:

$$X = \text{Hash}(e(K', KRB)),$$

where the various functions are defined as before.

In the envisioned protocol, Alice's application program 710, using the services of the KR subsystem 708 when required, generates a key exchange block (KEB) for key K', generates a key recovery block (KRB) for K, generates the encrypted value e(X, Y) from the calculated values of X and Y, encrypts data to produce e(K, data), and transmits KEB, KRB, e(X, Y), e(K, data) to Bob. Bob, who must have KRB in order to compute X, which is required to decrypt e(X, Y) in order to recover Y so that K can be calculated from K', cannot circumvent the protocol. Under the protocol, Alice must send KRB to Bob.

Possible advantages of this embodiment over the first embodiment are: (a) K is an independent key generated by the key recovery system rather than a dependent key (as in the first embodiment); and (b) KRB is generated on K rather then K' (as in the first method). In the first embodiment, generating KRB on K' has the disadvantage that the KRB does not directly allow the recovery of K; in that embodiment, one would first use KRB to do a key recovery of K', and then K would be computed from K' and KRB via the equation K=Hash(e(K', KRB)). A possible disadvantage of this method over the first method is that this method requires an extra Exclusive-OR (XOR) operation of two secret values, K and K'. Such an operation may already be provided, however, by the cryptographic subsystem component of the KR subsystem 208.

Figure 8:
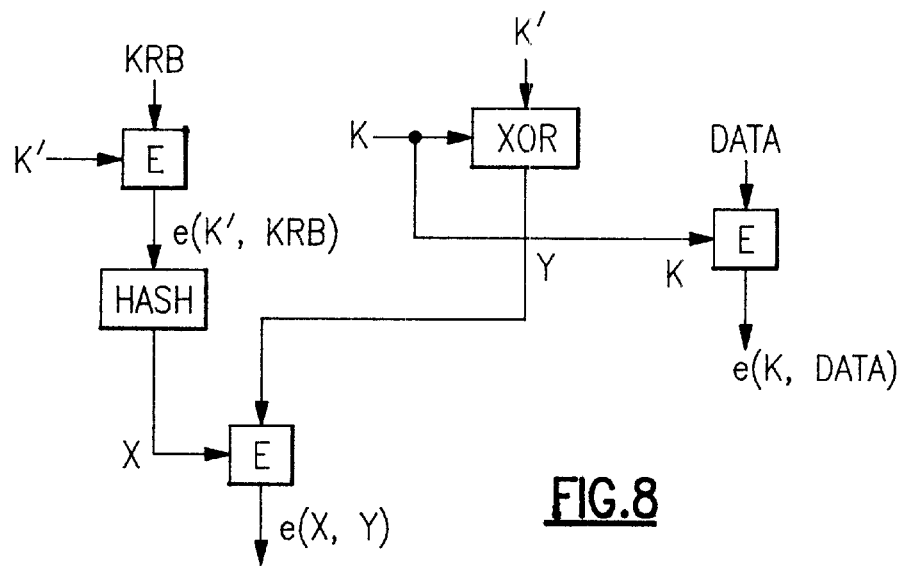
FIG. 8 shows the data transformations performed by the sender in the system shown in FIG. 7.
Figure 10:
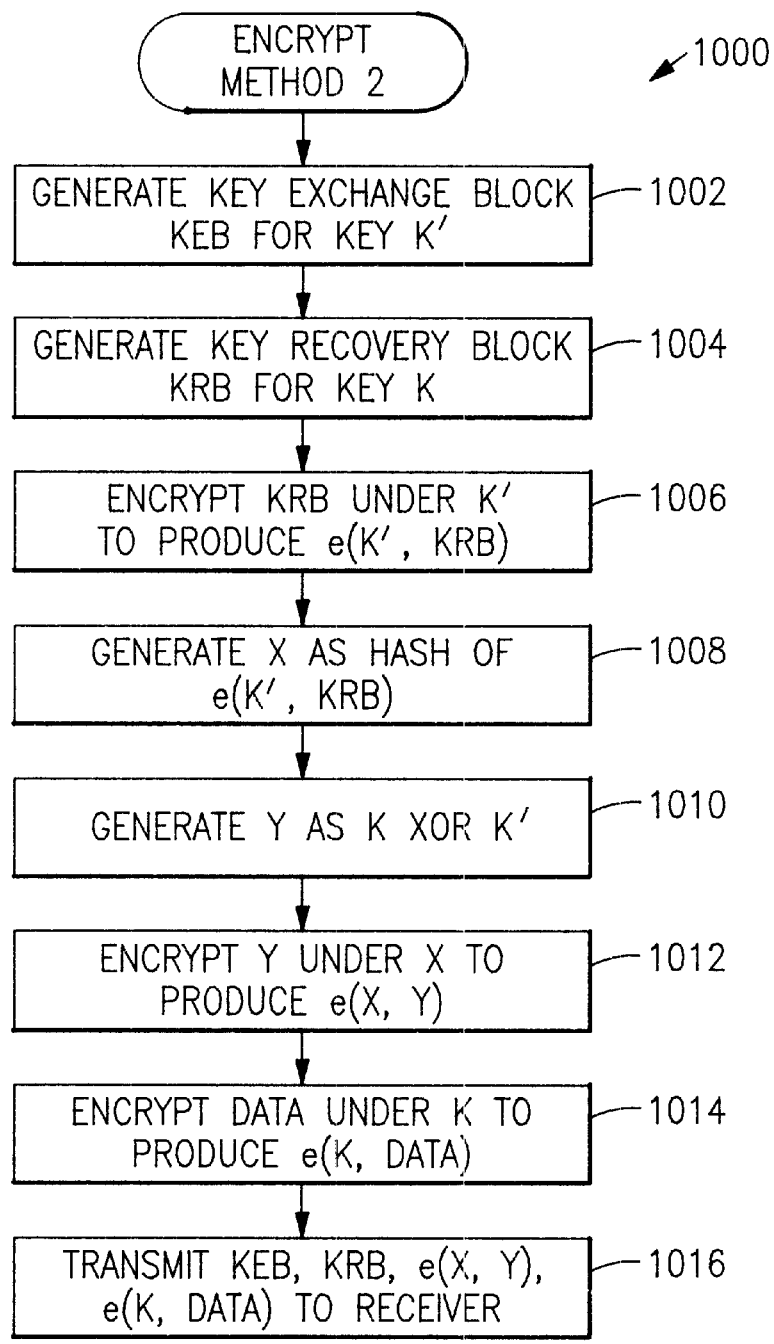
FIG. 10 shows the method steps performed by the sender in the system shown in FIG. 7.

FIG. 10 shows the encryption procedure 1000 performed by the sender 702 (Alice) in the system 700 shown in FIG. 7. FIG. 8 shows the data transformations performed in this procedure 1000. The procedure 1000 may be invoked when application program 710 provides a first key K' and plaintext data to KR subsystem 708. It is assumed in the description that follows that the KR subsystem 708 has already generated a second key K independently of the first key K'.

Upon receiving these parameters, the KR subsystem 708 first generates a key exchange block KEB from which the first key K' may be recovered by the receiver 704 (step 1002).

This may be done by encrypting the key K' under a public encryption key of the receiver 704, using a public-key procedure.

The KR subsystem 708 then generates a key recovery block KRB from which the independently generated key K may be recovered by a key recovery entity (step 1004). If there is one such entity, this may be done by encrypting the key K under a public encryption key of the key recovery entity. If there are multiple such entities, this may be done by encrypting shares of the key K under respective public encryption keys of the key recovery entities.

Next, the KR subsystem 708 encrypts the key recovery block KRB under the first key K' to generate an encrypted value e(K', KRB), as shown in FIG. 8 (step 1006). The KR subsystem then passes this encrypted value through a hash function to obtain a derived key X=Hash(e(K', KRB)), as shown in FIG. 8 (step 1008). This derived key X, like the independently generated key K, is kept in a private area of the KR subsystem 708 and is not made available to the application 710.

KR Subsystem 708 then generates a value Y as the XOR product of K and K' (step 1010) and encrypts Y under the derived key X to generate e(X, Y), as shown in FIG. 8 (step 1012).

Finally, the KR subsystem 708 encrypts the original plaintext data under the independently generated key K to obtain e(K, data), as shown in FIG. 8 (step 1014). The KR subsystem 708 returns the key exchange block KEB, the key recovery block KRB, the encrypted value e(X, Y) and the encrypted value e(K, data) to the application program 710, which transmits these values to the application program 714 in the receiver 704 (step 1012).

Figure 9:
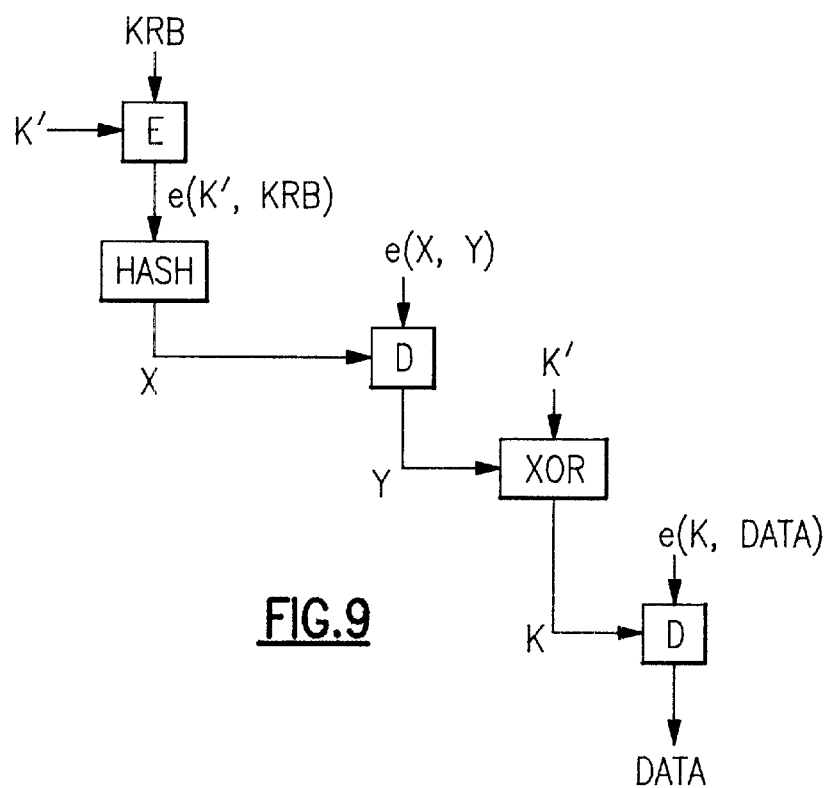
FIG. 9 shows the data transformations performed by the receiver in the system shown in FIG. 7.
Figure 11:
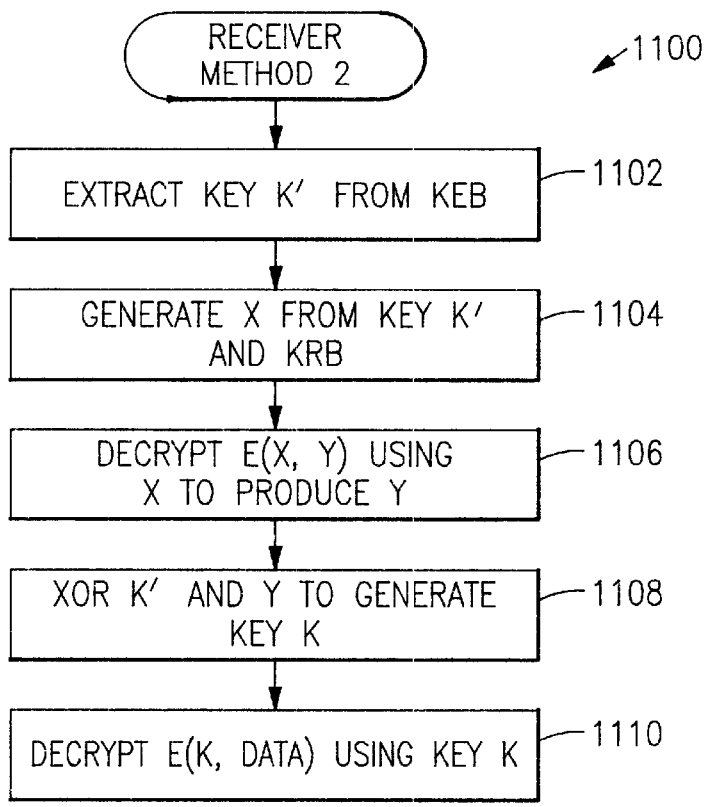
FIG. 11 shows the method steps performed by the receiver in the system shown in FIG. 7.

FIG. 11 shows the decryption procedure 1100 performed by the receiver 704 (Bob) in the system 700 shown in FIG. 7. FIG. 9 shows the data transformations performed in this procedure 1100. The steps shown are performed by the cryptographic subsystem 712 upon receiving the values KEB, KRB, e(X, Y) and e(K, data) from the application program 714.

Subsystem 712 first extracts the first key K' from the key exchange block KEB by reversing the generation procedure (step 1102). Thus, if KEB was generated by encrypting K' under a public encryption key of the receiver 704, then K' is regenerated by decrypting KEB using the corresponding private decryption key.

Subsystem 712 then regenerates the derived key X from the first key K' and the KRB, using the same procedure as the sender 702 in steps 1006-1008, as shown in FIG. 9 (step 1104). Subsystem 712 then decrypts e(X, Y) using the derived key X to regenerate Y (step 1106), which it XORs with K' to regenerate the key K, as shown in FIG. 9 (step 1108).

Finally, subsystem 712 decrypts e(K, data) using the regenerated key K, as shown in FIG. 9, and returns the plaintext data to the application program 714 (step 1110).

The effectiveness of the first and second embodiments in ensuring the generation and transmission of a correct KRB is predicated on the reliance of the application programs 210 and 710 on their associated KR subsystems 208 and 708 to perform strong encryption. That is, the encryption operations using the keys K' and K in the first embodiment and the keys K', K and X in the second embodiment are presumed to be strong encryption operations, which can be performed by the KR subsystems 208 and 708, respectively, but cannot be performed by their respective application programs 210 and 710. After all, if the application programs 210 and 710 could perform strong encryption independently of the KR subsystems 208 and 708, then there is no need for application programs 210 and 710 to use key recovery in order to obtain a strong encryption capability, and the enforcement procedures described above could be circumvented. This reliance of the application programs 210 and 710 on their associated KR subsystems 208 and 708 to perform strong encryption should therefore be enforced.

3. Third Embodiment

In a third embodiment the key establishment protocol (not the key itself) is made dependent on KRB. The advantage of this embodiment over the first two embodiments is that the key used to encrypt the data is the same as the key transmitted in the key exchange block (KEB), i.e., K=K'. A disadvantage of the method is that the binding is not as strong as the binding provided by the first two embodiments. For example, the method requires the verification step to be tightly integrated into Bob's key establishment method, and we must trust that Bob has not and will not alter the key establishment method, thereby circumventing the verification step. In situations where the key establishment method can be counted on to perform the verification step, this method may be the preferred method.

Figure 13:
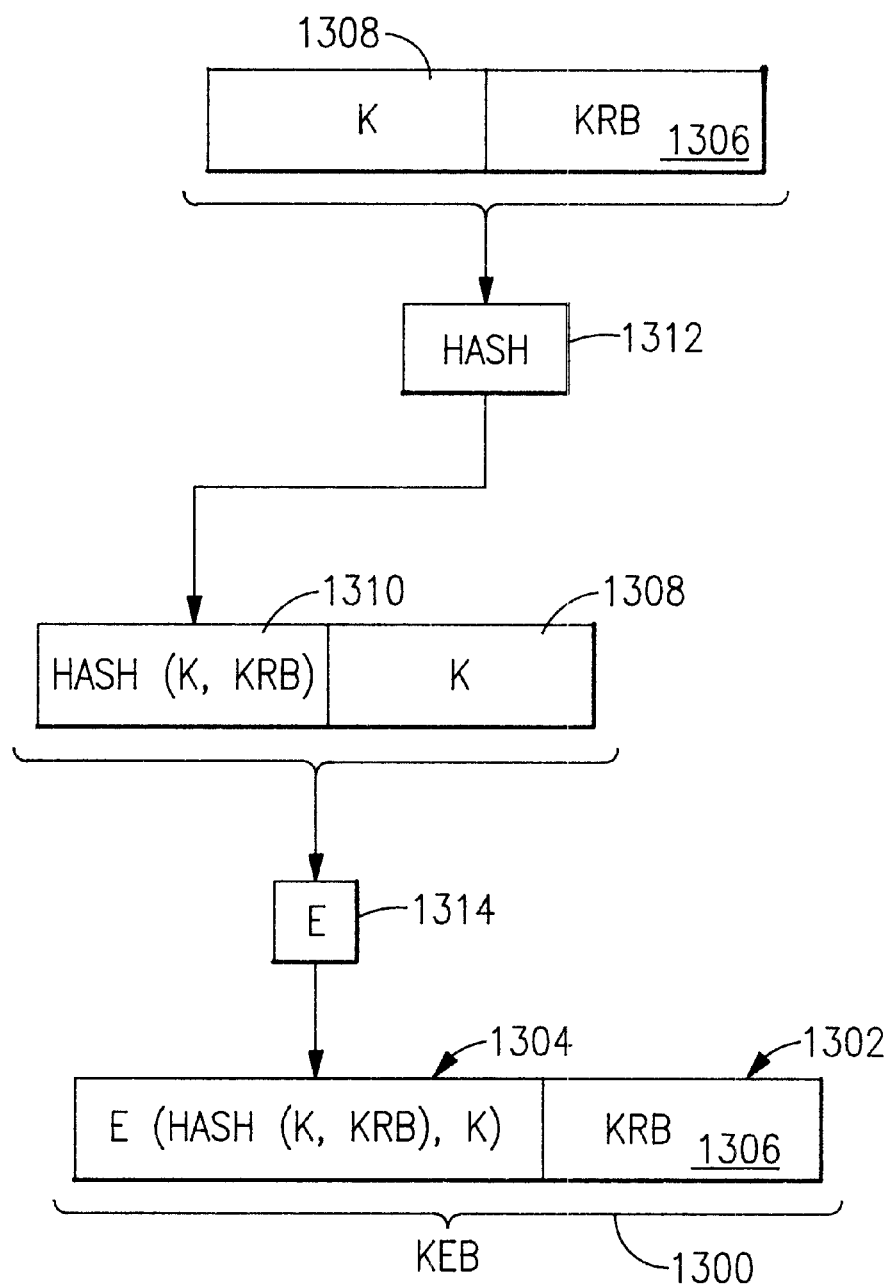
FIG. 13 shows the data transformations performed by the sender in the system shown in FIG. 12.

FIG. 13 shows the data transformations performed by the sender in this third method. Referring to the figure, in this method we assume that a key exchange block (KEB) 1300 consists of an encrypted portion 1302 and an unencrypted portion 1304. The unencrypted portion 1304 contains at least one field 1306 for optional data, in which the KRB is transmitted. (In FIG. 13 the KRB field 1306 is shown as occupying the entire unencrypted portion 1304, although this need not be the case.) The encrypted portion 1302 contains at least the key (K) 1308 and a hash 1310 of at least the KRB 1306 in the unencrypted portion 1304 of the KEB 1300. For simplicity, we shall assume that the hash 1310 is calculated on the entire clear KEB 1300 less the hash field 1310 (i.e., on a portion including KRB field 1306 and key field 1308). The hash 1310 serves as an integrity value to ensure that the KRB has been correctly generated and has not been altered, as described below.

The KRB 1306 is ignored by Bob's application program 1214. However, because at least the KEB 1300 less the hash field 1310 is hashed and the hash value in field 1310 is included within the encrypted portion 1302 of the KEB 1300, there is no opportunity for Alice to delete or change the KRB 1306. This is so, because Bob's key establishment routine will calculate a similar hash value on the decrypted KEB 1300 and will compare it for equality with the hash-of-reference 1310 stored in the KEB. Only when the two hash values are equal will Bob's key establishment routine import K and make it available for decryption on Bob's system.

Figure 12:
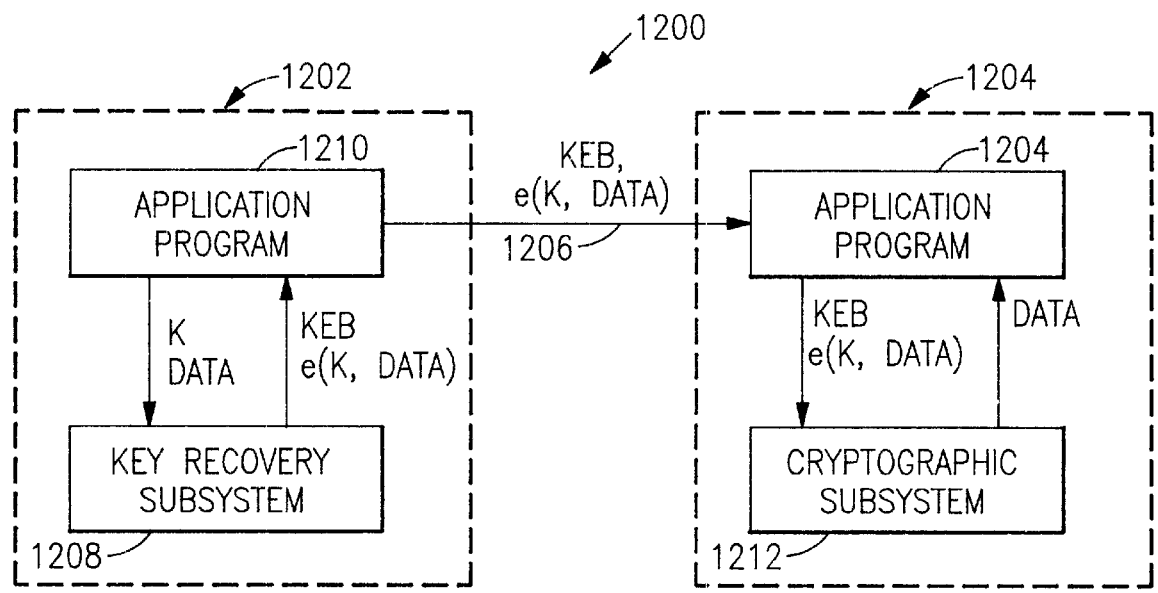
FIG. 12 shows a cryptographic communication system incorporating a third embodiment of the present invention.
Figure 15:
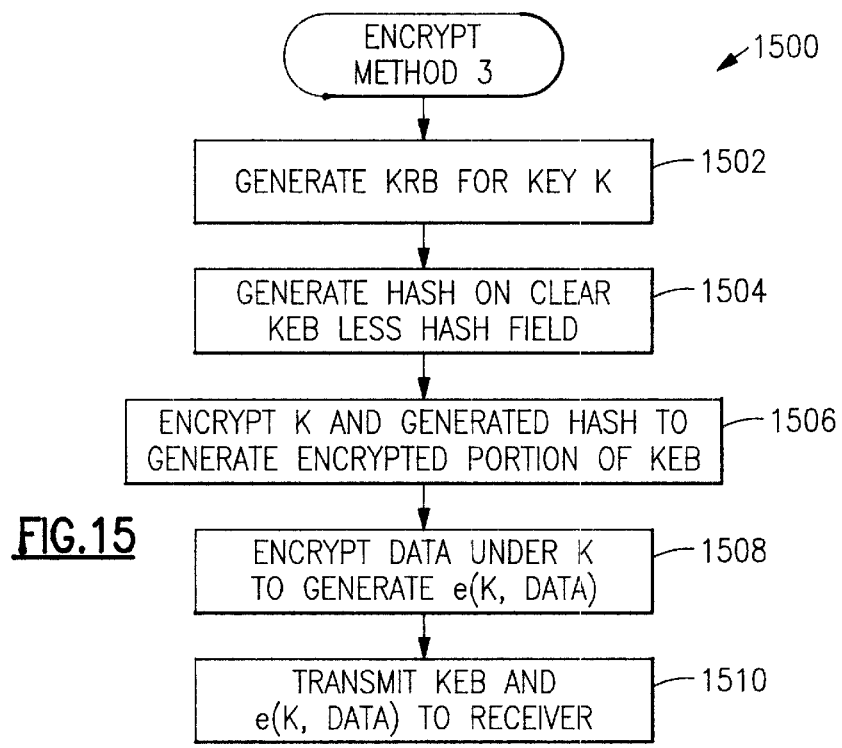
FIG. 15 shows the method steps performed by the sender in the system shown in FIG. 12.

FIG. 15 shows the encryption procedure 1500 performed by the sender 1202 (Alice) in the system 1202 shown in FIG. 12. This procedure 1500 may be invoked when application program 1210 provides a key (K) 1308 and plaintext data to KR subsystem 1208.

Upon receiving these parameters, the KR subsystem 1208 first generates a key recovery block (KRB) 1306 from which the key (K) 1308 may be recovered by a key recovery entity (step 1502). As before, if there is one such entity, this may be done by encrypting the key K under a public encryption key of the key recovery entity; if there are multiple such entities, this may be done by encrypting shares of the key K under respective public encryption keys of the key recovery entities.

Referring also to FIG. 13, the KR subsystem 1208 then generates at 1312 a hash on the clear KEB 1300 less the hash field 1310 (i.e., including the key (K) 1308 in clear form and the KRB 1306 ), for example, as Hash(K, KRB) (where the comma denotes concatenation) (step 1504). Next, the KR subsystem 1208 encrypts at 1314 the key (K) 1308 and the generated hash 1310, for example, as E(K, Hash(K, KRB)), to generate the encrypted portion 1304 of the KEB 1300 (step 1506); the method of encrypting Hash(K, KRB) and K can be with a public key (PUbob) belonging to Bob. KR subsystem 1208 concatenates the encrypted portion 1304 with the unencrypted portion 1302 containing the KRB 1306 to generate the KEB 1300.

Finally, the KR subsystem 1208 encrypts the original plaintext data under the key K to obtain e(K, data) (step 1508). The KR subsystem 1208 returns the key exchange block KEB 1300 (which includes the key recovery block KRB 1306) and the encrypted value e(K, data) to the application program 1210, which transmits these values to the application program 1214 in the receiver 1204 (step 1510).

Figure 14:
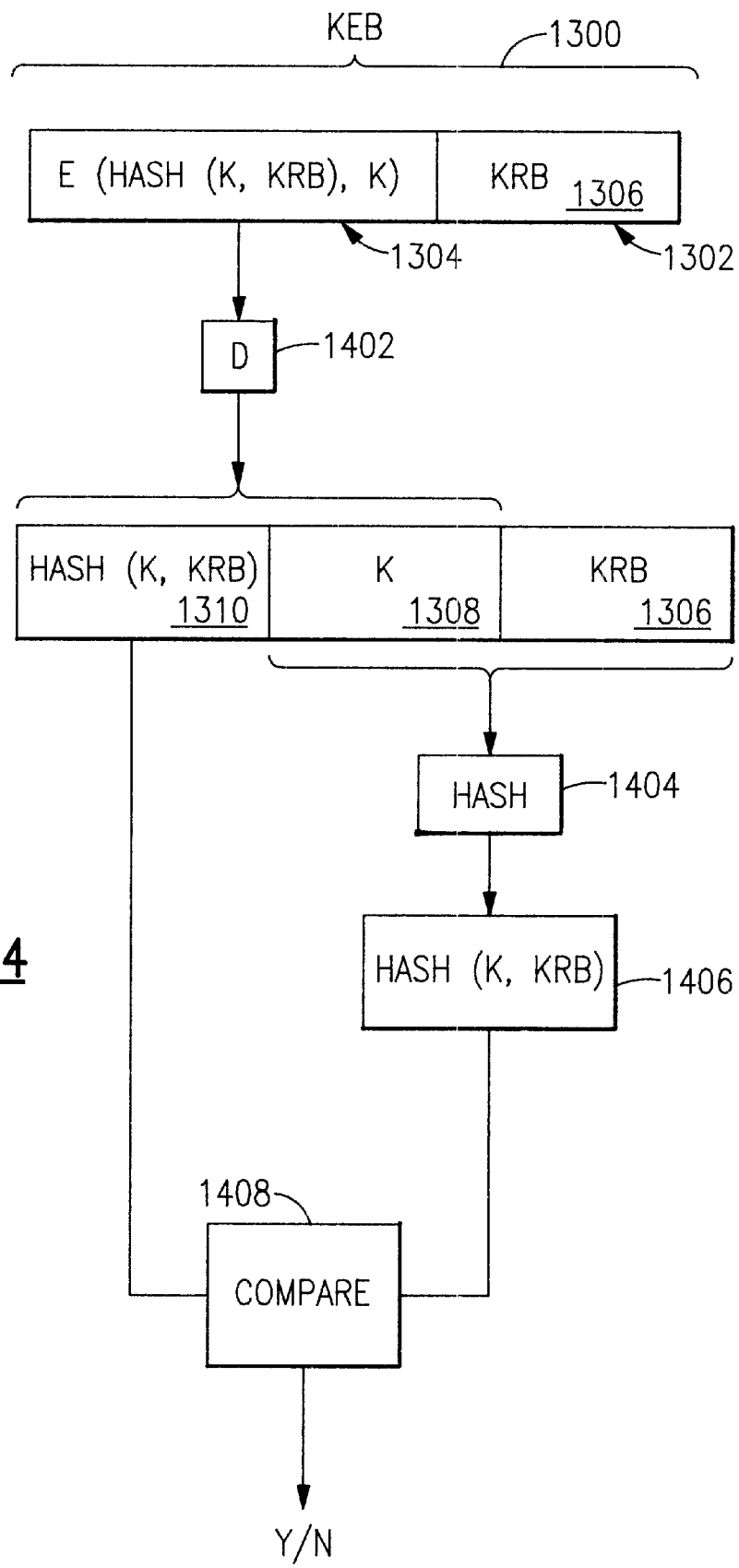
FIG. 14 shows the data transformations performed by the receiver in the system shown in FIG. 12.
Figure 16:
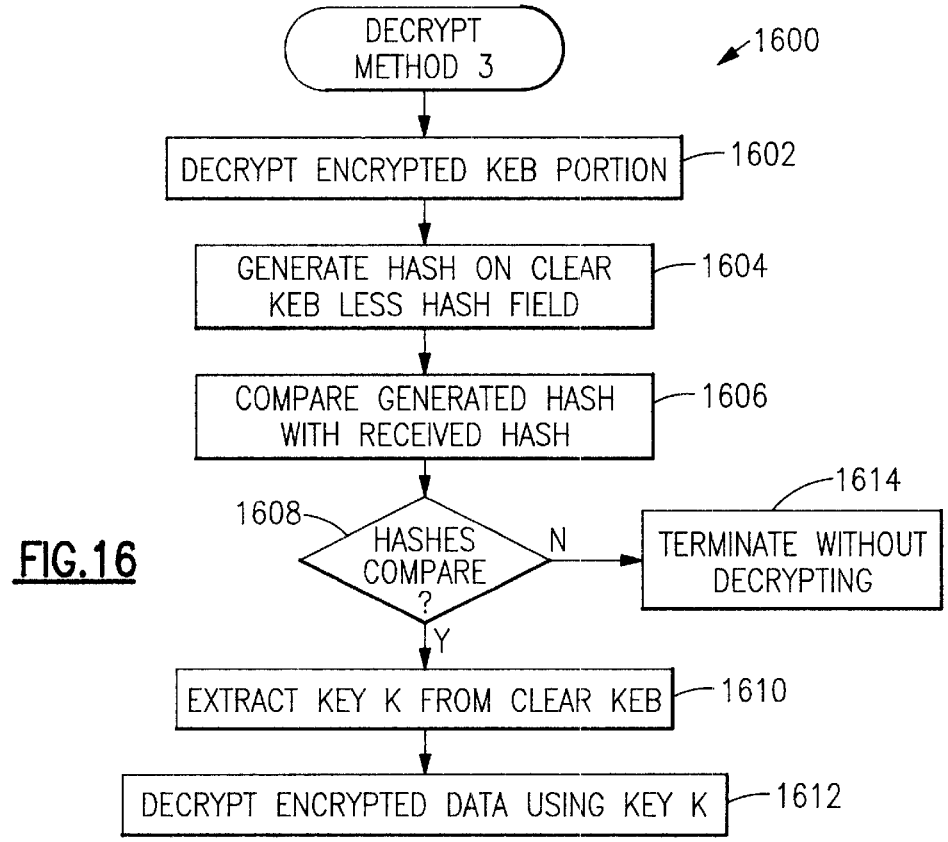
FIG. 16 shows the method steps performed by the receiver in the system shown in FIG. 12.

FIG. 16 shows the procedure 1600 performed by the receiver 1204 (Bob) in the system shown in FIG. 12. FIG. 14 shows the data transformations performed in this procedure. The steps shown are performed by the cryptographic subsystem 1212 upon receiving the values KEB and e(K, data) from the application program 1214.

Referring also to FIG. 14, subsystem 1212 first decrypts at 1402 the encrypted KEB portion 1304 to recover the key (K) 1308 and the hash 1310 in clear form (step 1602). Subsystem 1212 then generates at 1404 a hash 1406 on the clear KEB 1300 less the hash field 1310 (step 1604), and compares at 1408 the generated hash 1406 with the hash contained in the hash field 1310 (step 1606). If the two hashes compare (step 1608), then the subsystem 1212 proceeds to extract the key (K) 1308 from the clear KEB 1300 (step 1610) and uses this key to decrypt the encrypted data, which is returned in clear form to the application program (step 1612). Otherwise, the subsystem 1212 terminates the decryption procedure 1600 without decrypting the data or extracting the decryption key (step 1614).

While particular embodiments have been shown and described, various modifications will be apparent to those skilled in the art. Thus, in the first and second embodiments, rather than using a key exchange block, the key K' may be established between the sender and receiver by other means, such as by using some variation of the Diffie-Hellman key agreement protocol. Still other variations and modifications will be apparent to those skilled in the art.

What is claimed is:

1. In a cryptographic communication system in which a sender transmits data encrypted under an encryption key to a receiver, a method for ensuring the concomitant transmission of data sufficient to permit recovery of the encryption key by a key recovery entity, comprising the steps of:

generating a key recovery block from which a first key is recoverable by a key recovery entity;

generating a second key as a one-way function of the first key and the key recovery block; and encrypting the data under the second key to generate encrypted data, whereby the receiver cannot decrypt the encrypted data without receiving the key recovery block and regenerating the second key from the first and the key recovery block.

2. The method of claim 1, further comprising the step of:

transmitting the key recovery block and the encrypted data from the sender to the receiver.

3. The method of claim 2 in which the receiver performs the steps of:

regenerating the second key from the first key and the key recovery block; and decrypting the encrypted data using the second key.

4. The method of claim 1 in which the generating steps and the encrypting step are performed by a trusted component of the sender.

5. The method of claim 4 in which the second key is not made available outside of the trusted component of the sender.

6. The method of claim 1 further comprising the step of:

generating a key exchange block from which the first key is recoverable by the receiver.

7. The method of claim 6 further comprising the step of:

transmitting the key exchange block from the sender to the receiver.

8. The method of claim 7 in which the receiver performs the step of:

extracting the first key from the key exchange block.

9. The method of claim 1 in which the step of generating a second key comprises the steps of:

encrypting the key recovery block under the first key to generate an encrypted key recovery block; and generating the second key as a one-way function of the encrypted key recovery block.

10. In a cryptographic communication system in which a sender transmits data encrypted under an encryption key to a receiver, a method for ensuring the concomitant transmission of data sufficient to permit recovery of the encryption key by a key recovery entity, comprising the steps of:

generating a key recovery block from which a first key is recoverable by a key recovery entity;

generating a second key independently of the first key;

generating a third key as a one-way function of the first key and the key recovery block;

combining the first and second keys to obtain a result that can be recombined with the first key to regenerate the second key;

encrypting the result under the third key; and encrypting the data under the second key to generate encrypted data, whereby the receiver cannot decrypt the encrypted data without receiving the key recovery block, regenerating the third key from the first key and the key recovery block, decrypting the encrypted result using the regenerated third key, and recombining the result with the first key to regenerate the second key.

11. The method of claim 10, further comprising the step of:

transmitting the key recovery block, the encrypted result and the encrypted data from the sender to the receiver.

12. The method of claim 11 in which the receiver performs the steps of:

regenerating the third key from the first key and the key recovery block;

decrypting the encrypted result using the regenerated third key;

recombining the decrypted result with the first key to regenerate the second key; and decrypting the encrypted data using the regenerated second key.

13. The method of claim 10 in which the generating steps, the combining step and the encrypting steps are performed by a trusted component of the sender.

14. The method of claim 13 in which the second and third keys are not made available outside of the trusted component of the sender.

15. The method of claim 10, further comprising the step of:

generating a key exchange block from which the first key is recoverable by the receiver.

16. The method of claim 15, further comprising the step of:

transmitting the key exchange block from the sender to the receiver.

17. The method of claim 16 in which the receiver performs the step of:

extracting the first key from the key exchange block.

18. The method of claim 10 in which the step of generating the third key comprises the steps of:

encrypting the key recovery block under the first key to generate an encrypted key recovery block; and generating the third key as a one-way function of the encrypted key recovery block.

19. In a cryptographic communication system in which a sender transmits data encrypted under an encryption key to a receiver, a method for ensuring the concomitant transmission of data sufficient to permit recovery of the encryption key by a key recovery entity, comprising the steps of:

generating a key recovery block from which the encryption key is recoverable by a key recovery entity; and encrypting the data under an encryption procedure having a corresponding decryption procedure requiring the use of the key recovery block, whereby the receiver cannot decrypt the encrypted data without receiving the key recovery block and using the key recovery block in the decryption procedure; and transmitting the key recovery block and the encrypted data from the sender to the receiver;

the receiver performing the steps of:

receiving the key recovery block and the encrypted data; and decrypting the encrypted data by using the key recovery block in the decryption procedure.

20. In a cryptographic communication system in which a sender generates a key recovery block from which a first key is recoverable by a key recovery entity, encrypts data under a second key generated as a one-way function of the first key and the key recovery block, and transmits the key recovery block and the encrypted data to a receiver, a method for decrypting the encrypted data, comprising the steps of:

receiving the key recovery block and the encrypted data;

regenerating the second key from the first key and the key recovery block; and decrypting the encrypted data using the second key.

21. The method of claim 20 in which the step of regenerating the second key comprises the steps of:

encrypting the key recovery block under the first key to generate an encrypted key recovery block; and generating the second key as a one-way function of the encrypted key recovery block.

22. The method of claim 20 further comprising the step of:

extracting the first key from a key exchange block from which the key is recoverable by the receiver.

23. In a cryptographic communication system in which a sender generates a key recovery block from which a first key is recoverable by a key recovery entity, encrypts data under a second key generated independently of the first key, and transmits the key recovery block and the encrypted data to a receiver, along with a result of combining the first key with the second key that is encrypted under a third key generated as a one-way function of the first key and the key recovery block, a method for decrypting the encrypted data, comprising the steps of:

receiving the key recovery block and the encrypted data;

regenerating the third key from the first key and the key recovery block;

decrypting the encrypted result using the regenerated third key;

recombining the decrypted result with the first key to regenerate the second key; and decrypting the encrypted data using the regenerated second key.

24. The method of claim 23 in which the step of regenerating the third key comprises the steps of:

encrypting the key recovery block under the first key to generate an encrypted key recovery block; and generating the third key as a one-way function of the encrypted key recovery block.

25. The method of claim 23, further comprising the step of:

extracting the first key from a key exchange block from which the key is recoverable by the receiver.

26. In a cryptographic communication system in which a sender transmits data encrypted under an encryption key to a receiver, a method for ensuring the concomitant transmission of data sufficient to permit recovery of the encryption key by a key recovery entity, the method comprising the steps of:

generating a key recovery block from which a key is recoverable by a key recovery entity; and generating an integrity value as a one-way function of the key and the key recovery block, whereby a receiver of the key recovery block and the integrity value may verify the key recovery block without regenerating it by regenerating the integrity value as a one-way function of the key and the key recovery block and comparing the regenerated integrity value with the received integrity value.

27. The method of claim 26, comprising the further step of:

transmitting the key recovery block and the integrity value to the receiver.

28. The method of claim 26, further comprising the steps of:

encrypting the integrity value and the key to generate an encrypted portion of a key exchange block having an unencrypted portion containing the key recovery block; and encrypting the data under the key to generate encrypted data, whereby a receiver of the key exchange block may verify the key recovery block without regenerating it by decrypting the integrity value and the key, regenerating the integrity value as a one-way function of the key and the key recovery block, and comparing the regenerated integrity value with the decrypted integrity value.

29. The method of claim 28 in which the receiver performs the steps of:

decrypting the integrity value and the key;

regenerating the integrity value as a one-way function of the key and the key recovery block;

comparing the regenerated integrity value with the decrypted integrity value; and decrypting the encrypted data with the key only if the regenerated integrity value compares with the decrypted integrity value.

30. The method of claim 26 in which the receiver performs the steps of:

regenerating the integrity value as a one-way function of the key and the key recovery block;

comparing the regenerated integrity value with the received integrity value; and decrypting the encrypted data only if the regenerated integrity value compares with the received integrity value.

31. In a cryptographic communication system in which a sender transmits data encrypted under an encryption key to a receiver, along with a key recovery block from which the key is recoverable by a key recovery entity and an integrity value generated as a one-way function of the key and the key recovery block, a method for ensuring the concomitant transmission of data sufficient to permit recovery of the encryption key by a key recovery entity, comprising the steps of:

regenerating the integrity value as a one-way function of the key and the key recovery block;

comparing the regenerated integrity value with the received integrity value; and decrypting the encrypted data only if the regenerated integrity value compares with the received integrity value.

32. The method of claim 31 in which the sender sends the receiver a key exchange block containing an encrypted portion and an unencrypted portion, the encrypted portion containing the key and the integrity value, the unencrypted portion containing the key recovery block, the method further comprising the step of:

decrypting the integrity value and the key in the encrypted portion of the key exchange block.

33. In a cryptographic communication system in which a sender transmits data encrypted under an encryption key to a receiver, apparatus for ensuring the concomitant transmission of data sufficient to permit recovery of the encryption key by a key recovery entity, comprising:

means for generating a key recovery block from which a first key is recoverable by a key recovery entity;

means for generating a second key as a one-way function of the first key and the key recovery block; and means for encrypting the data under the second key to generate encrypted data, whereby the receiver cannot decrypt the encrypted data without receiving the key recovery block and regenerating the second key from the first key and the key recovery block.

34. The apparatus of claim 33 further comprising:

means for transmitting the key recovery block and the encrypted data from the sender to the receiver.

35. The apparatus of claim 34 in which the receiver comprises:

means for regenerating the second key from the first key and the key recovery block; and means for decrypting the encrypted data using the second key.

36. The apparatus of claim 33 in which the means for generating a second key comprises:

means for encrypting the key recovery block under the first key to generate an encrypted key recovery block; and means for generating the second key as a one-way function of the encrypted key recovery block.

37. In a cryptographic communication system in which a sender transmits data encrypted under an encryption key to a receiver, apparatus for ensuring the concomitant transmission of data sufficient to permit recovery of the encryption key by a key recovery entity, comprising:

means for generating a key recovery block from which a first key is recoverable by a key recovery entity;

means for generating a second key independently of the first key;

means for generating a third key as a one-way function of the first key and the key recovery block;

means for combining the first and second keys to obtain a result that can be recombined with the first key to regenerate the second key;

means for encrypting the result under the third key; and means for encrypting the data under the second key to generate encrypted data, whereby the receiver cannot decrypt the encrypted data without receiving the key recovery block, regenerating the third key from the first key and the key recovery block, decrypting the encrypted result using the regenerated third key, and recombining the result with the first key to regenerate the second key.

38. The apparatus of claim 37, further comprising:

means for transmitting the key recovery block, the encrypted result and the encrypted data from the sender to the receiver.

39. The apparatus of claim 38 in which the receiver comprises:

means for regenerating the third key from the first key and the key recovery block;

means for decrypting the encrypted result using the regenerated third key;

means for recombining the decrypted result with the first key to regenerate the second key; and means for decrypting the encrypted data using the regenerated second key.

40. The apparatus of claim 37 in which the means for generating the third key comprises:

means for encrypting the key recovery block under the first key to generate an encrypted key recovery block; and means for generating the third key as a one-way function of the encrypted key recovery block.

41. In a cryptographic communication system in which a sender generates a key recovery block from which a first key is recoverable by a key recovery entity, encrypts data under a second key generated as a one-way function of the first key and the key recovery block, and transmits the key recovery block and the encrypted data to a receiver, apparatus for decrypting the encrypted data, comprising:

means for receiving the key recovery block and the encrypted data;

means for regenerating the second key from the first key and the key recovery block; and means for decrypting the encrypted data using the second key.

42. The apparatus of claim 41 in which the means for regenerating the second key comprises:

means for encrypting the key recovery block under the first key to generate an encrypted key recovery block; and means for generating the second key as a one-way function of the encrypted key recovery block.

43. In a cryptographic communication system in which a sender generates a key recovery block from which an encryption key is recoverable by a key recovery entity, encrypts data under a second key generated independently of the first key, and transmits the key recovery block and the encrypted data to a receiver, along with a result of combining the first key with the second key that is encrypted under a third key generated as a one-way function of the first key and the key recovery block, apparatus for decrypting the encrypted data, comprising:

means for receiving the key recovery block and the encrypted data;

means for regenerating the third key from the first key and the key recovery block;

means for decrypting the encrypted result using the regenerated third key;

means for recombining the decrypted result with the first key to regenerate the second key; and means for decrypting the encrypted data using the regenerated second key.

44. The apparatus of claim 43 in which the means for regenerating the third key comprises:

means for encrypting the key recovery block under the first key to generate an encrypted key recovery block; and means for generating the third key as a one-way function of the encrypted key recovery block.

45. In a cryptographic communication system in which a sender transmits data encrypted under an encryption key to a receiver, apparatus for ensuring the concomitant transmission of data sufficient to permit recovery of the encryption key by a key recovery entity, the apparatus comprising:

means for generating a key recovery block from which a key is recoverable by a key recovery entity; and means for generating an integrity value as a one-way function of the key and the key recovery block, whereby a receiver of the key recovery block and the integrity value may verify the key recovery block without regenerating it by regenerating the integrity value as a one-way function of the key and the key recovery block and comparing the regenerated integrity value with the received integrity value.

46. The apparatus of claim 45, further comprising:

means for encrypting the integrity value and the key to generate an encrypted portion of a key exchange block having an unencrypted portion containing the key recovery block; and means for encrypting the data under the key to generate encrypted data, whereby a receiver of the key exchange block may verify the key recovery block without regenerating it by decrypting the integrity value and the key, regenerating the integrity value as a one-way function of the key and the key recovery block, and comparing the regenerated integrity value with the decrypted integrity value.

47. The apparatus of claim 46 in which the receiver comprises:

means for decrypting the integrity value and the key;

means for regenerating the integrity value as a one-way function of the key and the key recovery block;

means for comparing the regenerated integrity value with the decrypted integrity value; and means for decrypting the encrypted data with the key only if the regenerated integrity value compares with the decrypted integrity value.

48. The apparatus of claim 45 in which the receiver comprises:

means for regenerating the integrity value as a one-way function of the key and the key recovery block;

means for comparing the regenerated integrity value with the received integrity value; and means for decrypting the encrypted data only if the regenerated integrity value compares with the received integrity value.

49. In a cryptographic communication system in which a sender transmits data encrypted under an encryption key to a receiver, along with a key recovery block from which the key is recoverable by a key recovery entity and an integrity value generated as a one-way function of the key and the key recovery block, apparatus for ensuring the concomitant transmission of data sufficient to permit recovery of the encryption key by a key recovery entity, comprising:

means for regenerating the integrity value as a one-way function of the key and the key recovery block;

means for comparing the regenerated integrity value with the received integrity value; and means for decrypting the encrypted data only if the regenerated integrity value compares with the received integrity value.

50. The apparatus of claim 49 in which the sender sends the receiver a key exchange block containing an encrypted portion and an unencrypted portion, the encrypted portion containing the key and the integrity value, the unencrypted portion containing the key recovery block, the apparatus further comprising:

means for decrypting the integrity value and the key in the encrypted portion of the key exchange block.

51. A program storage device readable by a machine, tangibly embodying a program of instructions executable by the machine to perform method steps for ensuring the concomitant transmission of data sufficient to permit recovery of an encryption key by a key recovery entity in a cryptographic communication system in which a sender transmits data encrypted under an encryption key to a receiver, the method steps comprising:

generating a key recovery block from which a key is recoverable by a key recovery entity; and generating an integrity value as a one-way function of the key and the key recovery block, whereby a receiver of the key recovery block and the integrity value may verify the key recovery block without regenerating it by regenerating the integrity value as a one-way function of the key and the key recovery block and comparing the regenerated integrity value with the received integrity value.

52. A program storage device readable by a machine, tangibly embodying a program of instructions executable by the machine to perform method steps for ensuring the concomitant transmission of data sufficient to permit recovery of an encryption key by a key recovery entity in a cryptographic communication system in which a sender transmits data encrypted under an encryption key to a receiver, along with a key recovery block from which the key is recoverable by a key recovery entity and an integrity value generated as a one-way function of the key and the key recovery block, the method steps comprising:

regenerating the integrity value as a one-way function of the key and the key recovery block;

comparing the regenerated integrity value with the received integrity value; and decrypting the encrypted data only if the regenerated integrity value compares with the received integrity value.

53. A program storage device readable by a machine, tangibly embodying a program of instructions executable by the machine to perform method steps for ensuring the concomitant transmission of data sufficient to permit recovery of an encryption key by a key recovery entity in a cryptographic communication system in which a sender transmits data encrypted under the encryption key to a receiver, the method steps comprising:

generating a key recovery block from which a first key is recoverable by a key recovery entity;

generating a second key as a one-way function of the first key and the key recovery block; and encrypting the data under the second key to generate encrypted data, whereby the receiver cannot decrypt the encrypted data without receiving the key recovery block and regenerating the second key from the first key and the key recovery block.

54. A program storage device readable by a machine, tangibly embodying a program of instructions executable by the machine to perform method steps for ensuring the concomitant transmission of data sufficient to permit recovery of an encryption key by a key recovery entity in a cryptographic communication system in which a sender transmits data encrypted under the encryption key to a receiver, the method steps comprising:

generating a key recovery block from which a first key is recoverable by a key recovery entity;

generating a second key independently of the first key;

generating a third key as a one-way function of the first key and the key recovery block;

combining the first and second keys to obtain a result that can be recombined with the first key to regenerate the second key;

encrypting the result under the third key; and encrypting the data under the second key to generate encrypted data, whereby the receiver cannot decrypt the encrypted data without receiving the key recovery block, regenerating the third key from the first key and the key recovery block, decrypting the encrypted result using the regenerated third key, and recombining the result with the first key to regenerate the second key.

55. A program storage device readable by a machine, tangibly embodying a program of instructions executable by the machine to perform method steps for decrypting encrypted data in a cryptographic communication system in which a sender generates a key recovery block from which a first key is recoverable by a key recovery entity, encrypts data under a second key generated as a one-way function of the first key and the key recovery block, and transmits the key recovery block and the encrypted data to a receiver, the method steps comprising:

receiving the key recovery block and the encrypted data;

regenerating the second key from the first key and the key recovery block; and decrypting the encrypted data using the second key.

56. A program storage device readable by a machine, tangibly embodying a program of instructions executable by the machine to perform method steps for decrypting encrypted data in a cryptographic communication system in which a sender generates a key recovery block from which a first key is recoverable by a key recovery entity, encrypts data under a second key generated independently of the first key, and transmits the key recovery block and the encrypted data to a receiver, along with a result of combining the first key with the second key that is encrypted under a third key generated as a one-way function of the first key and the key recovery block, the method steps comprising:

receiving the key recovery block and the encrypted data;

regenerating the third key from the first key and the key recovery block;

decrypting the encrypted result using the regenerated third key;

recombining the decrypted result with the first key to regenerate the second key; and decrypting the encrypted data using the regenerated second key.

* * * * *